(12) United States Patent
Hanefeld et al.

(10) Patent No.: US 8,357,829 B2
(45) Date of Patent: Jan. 22, 2013

(54) α-OLEFIN/ISOBUTENE DIBLOCK COPOLYMERS

(75) Inventors: Phillip Hanefeld, Heidelberg (DE); Hans Peter Rath, Gruenstadt (DE); Helmut Mach, Heidelberg (DE); Rainer Urban, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 125 days.

(21) Appl. No.: 12/988,641

(22) PCT Filed: May 6, 2009

(86) PCT No.: PCT/EP2009/055481
§ 371 (c)(1),
(2), (4) Date: Oct. 20, 2010

(87) PCT Pub. No.: WO2009/135876
PCT Pub. Date: Nov. 12, 2009

(65) Prior Publication Data
US 2011/0034360 A1 Feb. 10, 2011

(30) Foreign Application Priority Data
May 7, 2008 (EP) .................................... 08155831

(51) Int. Cl.
*C10M 107/02* (2006.01)
*C10M 143/00* (2006.01)

(52) U.S. Cl. ......................................... 585/12; 508/591
(58) Field of Classification Search .................. 508/591; 585/12
See application file for complete search history.

(56) References Cited

U.S. PATENT DOCUMENTS

| | | | |
|---|---|---|---|
| 4,327,201 A | 4/1982 | Kennedy et al. | |
| 4,946,889 A | 8/1990 | Nishioka | |
| 5,169,914 A | 12/1992 | Kaszas et al. | |
| 7,001,966 B2 * | 2/2006 | Lang et al. | 526/348.7 |
| 7,132,488 B2 * | 11/2006 | Huffer et al. | 526/237 |
| 7,244,870 B2 * | 7/2007 | Lange et al. | 585/530 |
| 7,767,748 B2 * | 8/2010 | Leyrer et al. | 524/459 |
| 7,842,302 B2 * | 11/2010 | Mock-Knoblauch et al. | 424/401 |
| 2004/0198613 A1 | 10/2004 | Eveland et al. | |
| 2007/0287779 A1 | 12/2007 | Kimura et al. | |
| 2008/0249264 A1 * | 10/2008 | Hanefeld et al. | 526/126 |
| 2008/0249267 A1 * | 10/2008 | Hanefeld et al. | 526/198 |
| 2008/0293900 A1 * | 11/2008 | Hanefeld et al. | 526/192 |
| 2010/0292422 A1 * | 11/2010 | Rath et al. | 526/134 |

FOREIGN PATENT DOCUMENTS

| | | |
|---|---|---|
| DE | 40 25 961 | 2/1992 |
| DE | 196 48 028 | 3/1997 |
| DE | 196 10 350 | 9/1997 |
| DE | 196 42 770 | 4/1998 |
| DE | 101 28 242 | 12/2002 |
| EP | 0 206 756 | 12/1986 |
| EP | 0 264 214 | 4/1988 |
| EP | 0 265 053 | 4/1988 |
| EP | 0 613 873 | 9/1994 |
| EP | 0 668 257 | 8/1995 |
| EP | 1 469 060 | 10/2004 |
| EP | 1 816 086 | 8/2007 |
| WO | 93 24539 | 12/1993 |
| WO | 96 23751 | 8/1996 |
| WO | 96 28486 | 9/1996 |
| WO | 99 67347 | 12/1999 |
| WO | 2004 113402 | 12/2004 |
| WO | 2009 135877 | 11/2009 |

OTHER PUBLICATIONS

Suvegh, K. et al., "Effects of the Degree of Polymerization on the Free Volume Structure of Linear Amphiphilic Poly (isobutylene)-poly(methyl vinyl ether) Diblock Copolymers", Radiation Physics and Chemistry, vol. 74, pp. 247-251, XP 005039597 ISSN: 0969-806X. (Oct. 1, 2005).

International Search Report issued Aug. 4, 2009 in PCT/EP09/055481 filed May 6, 2009.

* cited by examiner

Primary Examiner — Ellen McAvoy
(74) Attorney, Agent, or Firm — Oblon, Spivak, McClelland, Maier & Neustadt, L.L.P.

(57) ABSTRACT

The present invention relates to diblock copolymers of the formula A-B which are formed from a polymer block A which is formed essentially from α-olefin units having from 6 to 22 carbon atoms, and a polymer block B which is formed essentially from isobutene units, to a process for their preparation, to their use in lubricant compositions and to lubricant compositions which comprise such diblock copolymers.

23 Claims, No Drawings

α-OLEFIN/ISOBUTENE DIBLOCK COPOLYMERS

The present invention relates to diblock copolymers of the formula A-B which are formed from a polymer block A which is formed essentially from α-olefin units having from 6 to 22 carbon atoms, and a polymer block B which is formed essentially from isobutene units, to a process for their preparation, to their use in lubricant compositions and to lubricant compositions which comprise such diblock copolymers.

The economically most significant lubricant compositions are motor oils, transmission oils, such as manual and automatic transmission oils, and lubricant greases. Motor oils must also have sufficiently high viscosities at high temperatures in order to ensure an impeccable lubrication effect and a good seal between cylinder and piston. Furthermore, the flow properties of motor oils must also be such that the engine can be started at low temperatures without any problem. High demands on the viscosity behavior are of course also made on all other lubricant compositions.

The viscosity of a substance is fundamentally a temperature-dependent parameter, which falls with increasing temperature and rises with falling temperature. One measure of this temperature dependence is the viscosity index (VI): the higher the viscosity index of a substance, the lower the temperature dependence of the viscosity of the particular substance. A few years ago, owing to the low viscosity indices of the motor oils for motor vehicles, winter oils (low viscosity) and summer oils (higher viscosity) were still in use, which required a biannual oil change in temperate and colder climate zones. However, multigrade oils now allow operation both in winter and in summer. These multigrade oils have a high viscosity index, which is achieved either by virtue of the base oil already having a high VI, or by virtue of VI improvers being added to the oil, i.e. additives which reduce the temperature dependence of the viscosity of the base oils. In general, the known VI improvers essentially act principally in one direction, i.e. they counteract either the decline in viscosity with increasing temperature or else the increase in viscosity with falling temperature.

Poly-α-olefins (PAO) have been used for some time as components in synthetic lubricants. In motor oils, they partly or completely replace mineral base oils and thus themselves serve as a lubricant component, or they are added as additives in partly or fully synthetic motor oils or in mineral motor oils. Their task is more particularly to improve the viscosity index. While PAO-containing oils generally exhibit good viscosity behavior at low temperatures, their viscosity is not always satisfactory at higher temperatures; i.e. the viscosity is too low, and so the lubricant film breaks easily. Moreover, they do not have sufficient thickening properties and are thus not particularly suitable for use in lubricant greases.

Polyisobutenes are also known as components in synthetic lubricants. Polyisobutene-containing motor oils do exhibit sufficient thickening action and also positive viscosity behavior at higher temperatures; but the viscosity at low temperatures is unsatisfactory.

It was an object of the present invention to provide compounds which impart a good viscosity profile to a lubricant composition comprising them. More particularly, they should increase the viscosity index of the lubricant composition. In particular, they should have a sufficiently low viscosity not only at low temperatures, but also simultaneously have a sufficiently high viscosity at high temperatures. Moreover, they should bring about sufficient thickening of the lubricant composition.

The object is achieved by a diblock copolymer of the formula

A-B in which
A is a polymer block A which is formed essentially from α-olefin units having from 6 to 22 carbon atoms (in the α-olefin); and
B is a polymer block B which is formed essentially from isobutene units.

Polymer block A is "essentially" formed from α-olefin units (in polymerized form). "Essentially" means that polymer block A, for example as a result of the industrial preparation process, as well as the polymerized α-olefins, may also comprise, in copolymerized form, minor amounts of other monomers, which may be present, for example, as impurities in the monomer source. In addition, polymer block A, likewise as a result of the preparation process, may comprise regulators, starter molecules and the like, which are used in the polymerization of the α-olefins. Preferably, polymer block A is formed to an extent of at least 90% by weight, more preferably to an extent of at least 95% by weight and especially to an extent of at least 98% by weight, based on the total weight of polymer block A, from polymerized α-olefins.

Polymer block B is "essentially" formed from isobutene units (in polymerized form). "Essentially" means that polymer block B, for example as a result of the industrial preparation process, as well as the polymerized isobutene, may also comprise minor amounts of other monomers, which may be present, for example, as impurities or mixed components in the monomer source. In addition, polymer block B, likewise as a result of the preparation process, may comprise regulators, chain-terminating reagents and the like, which are used in the polymerization of the isobutene. Preferably, polymer block B is formed to an extent of at least 90% by weight, more preferably to an extent of at least 95% by weight and especially to an extent of at least 98% by weight, based on the total weight of polymer block B, from polymerized isobutene.

For illustration, polymer block A can also be shown in simplified form as one which is essentially formed from repeat units of the formula

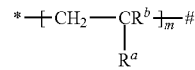

in which
$R^a$ is $C_4$-$C_{20}$-alkyl;
$R^b$ is hydrogen or $C_1$-$C_4$-alkyl;
with the proviso that the $R^a$ and $R^b$ radicals comprise a total of from 4 to 20 carbon atoms;
m is the number of repeat units; and
one of the variables * and # represents the start of the chain of polymer block A and the other the transition to polymer block B.

Preferably, $R^b$ is hydrogen or methyl and especially hydrogen.

Which of the variables * and # represents the start of the chain and which represents the transition to polymer block B depends in particular on the preparation conditions of polymer block A. In general, however, * will represent the start of the chain and # the transition to polymer block B. The way in which the chain starts likewise depends on the preparation conditions of polymer block A. Usually, * will, however, simply represent H. The transition to polymer block B may, for example, be a single bond; the type of # group also depends in particular on the preparation conditions of the diblock copolymer.

For illustration, polymer block B can also be shown in simplified form as one which is essentially formed from repeat units of the formula

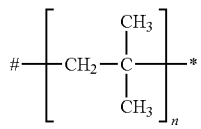

in which n is the number of repeat units; and one of the variables * and # represents the chain end of polymer block B and the other the transition to polymer block A.

For the variables * and #, the same statements as above apply. In this case, # here generally represents the transition to polymer block A and * the chain end. The way in which the chain ends depends on the termination of the preparation of the diblock copolymer and is explained in detail below.

It is obvious that the above drawings can be employed only for illustration and that the actual structure of the diblock copolymer may also have differences, for example as a result of the (fundamentally undesired) formation of side chains, etc.

In the context of the present invention, α-olefins are understood to mean those olefins which have an olefinic double bond at one end (i.e. in the α,β position) of the longest carbon chain of the molecule ($R^a$—$CR^b$=$CH_2$; $R^a$ is linear or branched $C_4$-$C_{20}$-alkyl and $R^b$ is hydrogen or linear or branched $C_1$-$C_4$-alkyl, preferably hydrogen or methyl and especially hydrogen).

$C_6$-$C_{22}$-α-Olefins are linear or branched alkenes having from 6 to 22 carbon atoms and a C—C double bond at one end (i.e. in the α,β position) of the longest carbon chain of the molecule. $C_6$-$C_{18}$-α-Olefins are linear or branched alkenes having from 6 to 18 carbon atoms and a C—C double bond at one end (i.e. in the α,β position) of the longest carbon chain of the molecule. $C_6$-$C_{14}$-α-Olefins are linear or branched alkenes having from 6 to 14 carbon atoms and a C—C double bond at one end (i.e. in the α,β position) of the longest carbon chain of the molecule. $C_6$-$C_{12}$-α-Olefins are linear or branched alkenes having from 6 to 12 carbon atoms and a C—C double bond at one end (i.e. in the α,β position) of the longest carbon chain of the molecule. $C_6$-$C_{12}$-α-Olefins are linear or branched alkenes having from 8 to 12 carbon atoms and a C—C double bond at one end (i.e. in the α,β position) of the longest carbon chain of the molecule.

$C_6$-$C_{10}$-Alkyl is a linear or branched alkyl group having from 6 to 10 carbon atoms. Examples thereof are hexyl, heptyl, octyl, 2-ethylhexyl, nonyl, decyl, 2-propylheptyl and the positional isomers thereof. $C_4$-$C_{10}$-Alkyl is a linear or branched alkyl group having from 4 to 10 carbon atoms. Examples thereof are, as well as the radicals specified above for $C_6$-$C_{10}$-alkyl, n-butyl, sec-butyl, isobutyl, tert-butyl, pentyl and the positional isomers thereof. $C_4$-$C_{12}$-Alkyl is a linear or branched alkyl group having from 4 to 12 carbon atoms. Examples thereof are, as well as the radicals specified above for $C_6$-$C_{10}$-alkyl, undecyl, dodecyl and the positional isomers thereof. $C_4$-$C_{16}$-Alkyl is a linear or branched alkyl group having from 4 to 16 carbon atoms. Examples thereof are, as well as the radicals specified above for $C_4$-$C_{12}$-alkyl, tridecyl, tetradecyl, pentadecyl, hexadecyl and the positional isomers thereof. $C_4$-$C_{20}$-Alkyl is a linear or branched alkyl group having from 4 to 20 carbon atoms. Examples thereof are, as well as the radicals specified above for $C_2$-$C_{16}$-alkyl, heptadecyl, octadecyl, nonadecyl, eicosyl and the positional isomers thereof.

$C_1$-$C_4$-Alkyl is a linear or branched alkyl group having from 1 to 4 carbon atoms. Examples thereof are methyl, ethyl, n-propyl, isopropyl, n-butyl, sec-butyl, isobutyl and tert-butyl.

$C_1$-$C_6$-Alkyl is a linear or branched alkyl group having from 1 to 6 carbon atoms. Examples thereof are, as well as the radicals specified above for $C_1$-$C_4$-alkyl, n-pentyl, 1-methylbutyl, 2-methylbutyl, 3-methylbutyl, 2,2-dimethylpropyl, 1-ethylpropyl, 1,1-dimethylpropyl, 1,2-dimethylpropyl, n-hexyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl and further positional isomers thereof.

$C_1$-$C_8$-Alkyl is a linear or branched alkyl group having from 1 to 8 carbon atoms. Examples thereof are the above-mentioned $C_1$-$C_6$-alkyl radicals and additionally heptyl, octyl and constitutional isomers thereof such as 2-ethylhexyl.

$C_1$-$C_{10}$-Alkyl is a linear or branched alkyl group having from 1 to 10 carbon atoms. Examples thereof are the above-mentioned $C_1$-$C_8$-alkyl radicals and additionally nonyl, decyl and constitutional isomers thereof.

$C_1$-$C_{20}$-Alkyl is a linear or branched alkyl group having from 1 to 20 carbon atoms. Examples thereof are the above-mentioned $C_1$-$C_{10}$-alkyl radicals and additionally undecyl, dodecyl, tridecyl, tetradecyl, pentadecyl, hexadecyl, heptadecyl, octadecyl, nonadecyl, eicosyl and constitutional isomers thereof.

$C_4$-$C_{20}$-Alkyl is a linear or branched alkyl group having from 4 to 20 carbon atoms. Examples thereof are methyl, ethyl, n-propyl, isopropyl, n-butyl, sec-butyl, isobutyl, tert-butyl, n-pentyl, 1-methylbutyl, 2-methylbutyl, 3-methylbutyl, 2,2-dimethylpropyl, 1-ethylpropyl, 1,1-dimethylpropyl, 1,2-dimethylpropyl, n-hexyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl, heptyl, octyl, 2-ethylhexyl, nonyl, decyl, undecyl, dodecyl, tridecyl, tetradecyl, pentadecyl, hexadecyl, heptadecyl, octadecyl, nonadecyl, eicosyl and constitutional isomers thereof.

$C_2$-$C_8$-Hydroxyalkyl is a linear or branched alkyl radical having from 2 to 8, especially from 2 to 4 carbon atoms, in which at least one, for example 1, 2, 3 or 4, of the hydrogen atoms are replaced by a hydroxyl group. Examples thereof are 2-hydroxy-1-ethyl, 2- and 3-hydroxy-1-propyl, 2-, 3- and 4-hydroxy-1-butyl, 2-, 3-, 4- and 5-hydroxy-1-pentyl, 2-, 3-, 4-, 5- and 6-hydroxy-1-hexyl, 2-, 3-, 4-, 5-, 6- and 7-hydroxy-1-heptyl, 2-, 3-, 4-, 5-, 6-, 7- and 8-hydroxy-1-octyl, 2,3-dihydroxy-1-propyl and constitutional isomers thereof.

Cycloalkyl is generally $C_3$-$C_8$-cycloalkyl, i.e. a saturated carbocycle having 3, 4, 5, 6, 7 or 8 carbon atoms as ring members, such as cyclopropyl, cyclobutyl, cyclopentyl, cyclohexyl, cycloheptyl or cyclooctyl. The cycloalkyl radical may optionally have one or more $C_1$-$C_{10}$-alkyl groups as substituents.

$C_3$-$C_7$-Cycloalkyl is a saturated carbocycle having 3, 4, 5, 6 or 7 carbon atoms as ring members, for example cyclopropyl, cyclopentyl, cyclohexyl and cycloheptyl. $C_5$-$C_7$-Cycloalkyl is a saturated carbocycle having 5, 6 or 7 carbon atoms as ring members, for example cyclopentyl, cyclohexyl and cycloheptyl.

Alkylene is, for example, $C_1$-$C_8$-alkylene, $C_2$-$C_8$-alkylene, $C_2$-$C_6$-alkylene, $C_2$-$C_5$-alkylene or preferably $C_2$-$C_4$-alkylene and especially $C_2$-$C_3$-alkylene.

$C_2$-$C_3$-Alkylene is a linear or branched bridging hydrocarbon group having 2 or 3 carbon atoms, such as 1,2-ethylene, 1,2- and 1,3-propylene. Linear $C_2$-$C_3$-alkylene is 1,2-ethylene or 1,3-propylene.

$C_2$-$C_4$-Alkylene is a linear or branched bridging hydrocarbon group having 2, 3 or 4 carbon atoms, such as 1,2-ethylene, 1,2- and 1,3-propylene, 1,2-, 1,3-, 2,3- and 1,4-butylene, 2,2-dimethyl-1,2-ethylene, 1,1-dimethyl-1,2-ethylene and the like.

$C_2$-$C_4$-Alkylene is a linear or branched bridging hydrocarbon group having 2, 3 or 4 carbon atoms, such as 1,1- and 1,2-ethylene, 1,1-, 1,2-, 2,2- and 1,3-propylene, 1,1-, 1,2-, 2,2-, 1,3-, 2,3- and 1,4-butylene, 2,2-dimethyl-1,2-ethylene, 1,1-dimethyl-1,2-ethylene and constitutional isomers thereof. The bridging unit in $C_2$-$C_4$-alkylene preferably comprises at least two carbon atoms. Preferred examples of $C_2$-$C_4$-alkylene are thus 1,2-ethylene, 1,2- and 1,3-propylene, 1,2-, 1,3-, 2,3- and 1,4-butylene, 2,2-dimethyl-1,2-ethylene, 1,1-dimethyl-1,2-ethylene and the like.

$C_2$-$C_6$-Alkylene is a linear or branched bridging hydrocarbon group having 2, 3, 4, 5 or 6 carbon atoms, such as 1,1- and 1,2-ethylene, 1,1-, 1,2-, 2,2- and 1,3-propylene, 1,1-, 1,2-, 2,2-, 1,3-, 2,3- and 1,4-butylene, 2,2-dimethyl-1,2-ethylene, 1,1-dimethyl-1,2-ethylene, 1,5-pentylene, 1,6-hexylene and constitutional isomers thereof. The bridging unit in $C_2$-$C_6$-alkylene preferably comprises at least two carbon atoms. Preferred examples of $C_2$-$C_6$-alkylene are thus 1,2-ethylene, 1,2- and 1,3-propylene, 1,2-, 1,3-, 2,3- and 1,4-butylene, 2,2-dimethyl-1,2-ethylene, 1,1-dimethyl-1,2-ethylene, 1,5-pentylene, 1,6-hexylene and the like.

$C_2$-$C_8$-Alkylene is a linear or branched bridging hydrocarbon group having 2, 3, 4, 5, 6, 7 or 8 carbon atoms, such as 1,1- and 1,2-ethylene, 1,1-, 1,2-, 2,2- and 1,3-propylene, 1,1-, 1,2-, 2,2-, 1,3-, 2,3- and 1,4-butylene, 2,2-dimethyl-1,2-ethylene, 1,1-dimethyl-1,2-ethylene, 1,5-pentylene, 1,6-hexylene, 1,7-heptylene, 1,8-octylene and constitutional isomers thereof. The bridging unit in $C_2$-$C_8$-alkylene preferably comprises at least two carbon atoms. Preferred examples of $C_2$-$C_8$-alkylene are thus 1,2-ethylene, 1,2- and 1,3-propylene, 1,2-, 1,3-, 2,3- and 1,4-butylene, 2,2-dimethyl-1,2-ethylene, 1,1-dimethyl-1,2-ethylene, 1,5-pentylene, 1,6-hexylene, 1,7-heptylene, 1,8-octylene and the like.

$C_1$-$C_8$-Alkylene is a linear or branched bridging hydrocarbon group having 1, 2, 3, 4, 5, 6, 7 or 8 carbon atoms, such as methylene, 1,1- and 1,2-ethylene, 1,1-, 1,2-, 2,2- and 1,3-propylene, 1,1-, 1,2-, 2,2-, 1,3-, 2,3- and 1,4-butylene, 2,2-dimethyl-1,2-ethylene, 1,1-dimethyl-1,2-ethylene, 1,5-pentylene, 1,6-hexylene, 1,7-heptylene, 1,8-octylene and constitutional isomers thereof. The bridging unit in $C_2$-$C_8$-alkylene preferably comprises at least two carbon atoms. Preferred examples of $C_2$-$C_8$-alkylene are thus 1,2-ethylene, 1,2- and 1,3-propylene, 1,2-, 1,3-, 2,3- and 1,4-butylene, 2,2-dimethyl-1,2-ethylene, 1,1-dimethyl-1,2-ethylene, 1,5-pentylene, 1,6-hexylene, 1,7-heptylene, 1,8-octylene and the like.

Alkyloxy (alkoxy) is an alkyl radical bonded via an oxygen atom. Accordingly, aryloxy, cycloalkyloxy and arylalkyloxy are, respectively aryl, cycloalkyl and arylalkyl bonded via an oxygen atom.

$C_1$-$C_4$-Alkoxy is a $C_1$-$C_4$-alkyl radical as defined above, which is bonded via an oxygen atom. Examples are methoxy, ethoxy, propoxy, isopropoxy, butoxy, sec-butoxy, isobutoxy and tert-butoxy.

$C_1$-$C_6$-Alkoxy is a $C_1$-$C_6$-alkyl radical as defined above, which is bonded via an oxygen atom. Examples are, as well as the radicals specified above for $C_1$-$C_4$-alkoxy, pentoxy, hexoxy and constitutional isomers thereof.

$C_1$-$C_8$-Alkoxy is a $C_1$-$C_8$-alkyl radical as defined above, which is bonded via an oxygen atom. Examples are, as well as the radicals specified above for $C_1$-$C_6$-alkoxy, heptyloxy, octyloxy and constitutional isomers thereof.

$C_1$-$C_{10}$-Alkoxy is a $C_1$-$C_{10}$-alkyl radical as defined above, which is bonded via an oxygen atom. Examples are, as well as the radicals specified above for $C_1$-$C_8$-alkoxy, nonyloxy, decyloxy and constitutional isomers thereof.

Acyloxy (alkylcarbonyloxy) is an alkylcarbonyl radical bonded via oxygen, which preferably has from 1 to 6 carbon atoms in the alkyl moiety ($=C_1$-$C_6$-alkylcarbonyloxy). $C_1$-$C_6$-Alkylcarbonyloxy is a $C_1$-$C_6$-alkyl radical as defined above, which is bonded via a carbonyloxy group (C(O)O). Examples thereof are acetyloxy, propionyloxy, butyroxy, sec-butyroxy, isobutyroxy, tert-butyroxy, pentylcarbonyloxy, hexylcarbonyloxy and constitutional isomers thereof.

Aryl is a carbocyclic $C_6$-$C_{14}$-aromatic radical, such as phenyl, naphthyl, anthracenyl or phenanthrenyl, which optionally bears from 1 to 3 substituents which are selected from halogen, OH, $C_1$-$C_8$-alkoxy, $C_1$-$C_8$-alkyl, nitro, cyano and an aryl radical. Aryl is preferably phenyl which may be substituted as described above, and is especially unsubstituted phenyl.

Arylalkyl is an alkyl group which bears at least one aryl radical and is preferably a $C_1$-$C_{20}$-alkylaryl group. Aryl-$C_1$-$C_{20}$-alkyl is a $C_1$-$C_{20}$-alkyl group which bears at least one aryl radical. Examples thereof are benzyl, 1- and 2-phenylethyl, 1-, 2- and 3-phenylpropyl,1-, 2-, 3- and 4-phenylbutyl, 1-, 2-, 3-, 4- and 5-phenylpentyl, 1-, 2-, 3-, 4-, 5- and 6-phenylhexyl, 1-, 2-, 3-, 4-, 5-, 6- and 7-phenylheptyl, 1-, 2-, 3-, 4-, 5-, 6-, 7- and 8-phenyloctyl, 1-, 2-, 3-, 4-, 5-, 6-, 7-, 8- and 9-phenylnonyl, 1-, 2-, 3-, 4-, 5-, 6-, 7-, 8-, 9- and 10-phenyldecyl, 1-, 2-, 3-, 4-, 5-, 6-, 7-, 8-, 9-, 10 and 11-phenylundecyl, phenyldodecyl, phenyltridecyl, phenyltetradecyl, phenylpentadecyl, phenylhexadecyl, phenylheptadecyl, phenyloctadecyl, phenylnonadecyl and phenyleicosyl and constitutional isomers thereof.

$C_1$-$C_{10}$-Arylalkyl is a $C_1$-$C_{10}$-alkyl group which bears at least one aryl radical. Examples thereof are benzyl, 1- and 2-phenylethyl, 1-, 2- and 3-phenylpropyl, 1-, 2-, 3- and 4-phenylbutyl, 1-, 2-, 3-, 4- and 5-phenylpentyl, 1-, 2-, 3-, 4-, 5- and 6-phenylhexyl, 1-, 2-, 3-, 4-, 5-, 6- and 7-phenylheptyl, 1-, 2-, 3-, 4-, 5-, 6-, 7- and 8-phenyloctyl, 1-, 2-, 3-, 4-, 5-, 6-, 7-, 8- and 9-phenylnonyl, 1-, 2-, 3-, 4-, 5-, 6-, 7-, 8-, 9-, and 10-phenyldecyl and constitutional isomers thereof. $C_1$-$C_4$-Arylalkyl is a $C_1$-$C_4$-alkyl group which bears at least one aryl radical. Examples thereof are benzyl, 1- and 2-phenylethyl, 1-, 2- and 3-phenylpropyl and 1-, 2-, 3- and 4-phenylbutyl. More particularly, $C_1$-$C_4$-arylalkyl is benzyl or 2-phenylethyl.

Preferably, arylalkyl is benzyl or 2-phenylethyl.

Halogen is fluorine, chlorine, bromine or iodine and especially fluorine, chlorine or bromine.

The statements made below regarding individual preferred features of the inventive diblock copolymer, of its use and of the process for preparing it apply both taken alone and in any possible combination with one another.

The suitable number of repeat units of the α-olefin in polymer block A is determined by factors including the chain length of the α-olefin and the greater the number of carbon atoms in the α-olefin, the smaller it tends to be.

A suitable number of repeat units in polymer block A is, for example, from 2 to 20 or from 2 to 15 or preferably from 3 to 10.

In a preferred embodiment of the invention, polymer block A has from 2 to 10,more preferably from 3 to 10,even more preferably from 3 to 8,even more preferably from 3 to 6 and especially 3 or 4 repeat units of the α-olefin. Accordingly, m in the above formula is preferably from 2 to 10,more preferably from 3 to 10,even more preferably from 3 to 8,even more preferably from 3 to 6 and especially 3 or 4. These figures apply more preferably to polymer blocks A which are formed from α-olefins having from 8 to 14 and especially having from 8 to 12,for example having 10,carbon atoms.

Preferably, the α-olefins have from 6 to 18,more preferably from 6 to 16,even more preferably from 6 to 14 and especially from 8 to 14 carbon atoms. They especially have from 8 to 12 and even more especially 10 carbon atoms.

The α-olefins may be linear or branched. They are preferably linear. Examples of linear $C_8$-$C_{12}$-α-olefins are 1-octene, 1-nonene, 1-decene, 1-undecene and 1-dodecene. Examples of linear $C_6$-$C_{12}$-α-olefins are 1-hexene, 1-heptene, 1-octene, 1-nonene, 1-decene, 1-undecene and 1-dodecene. Examples of linear $C_6$-$C_{14}$-α-olefins are 1-hexene, 1-heptene, 1-octene, 1-nonene, 1-decene, 1-undecene, 1-dodecene, 1-tridecene and 1-tetradecene. Examples of linear $C_6$-$C_{18}$-α-olefins are 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene and 1-octadecene. Examples of linear $C_6$-$C_{22}$-α-olefins are 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 1-heneicosene and 1-docosene.

The α-olefins may be either a pure α-olefin or mixtures of different α-olefins. In the mixtures, the α-olefins may differ by the number of carbon atoms therein or else by virtue of them being positional isomers of one another (i.e. differing in their type of branching).

The α-olefin is especially 1-decene.

Polymer block B comprises preferably from 2 to 50,more preferably from 5 to 40 and especially from 10 to 40 isobutene repeat units. Accordingly, n in the above formula is preferably from 2 to 50,more preferably from 5 to 40 and especially from 10 to 40.

In a preferred embodiment of the invention, at least 60%, more preferably at least 70% and especially at least 75% of the diblock copolymer chains have a terminal olefinically unsaturated double bond. In other words, the inventive diblock copolymer preferably comprises at least 60 mol %, more preferably at least 70 mol % and especially at least 75 mol % of terminal olefinically unsaturated double bonds. These terminal double bonds are present preferably in polymer block B, i.e. polymer block B is preferably olefinically terminated. In the context of the present invention, a terminal olefinically unsaturated double bond is understood to mean a double bond in position 1 or 2 of the main polymer chain. In polyisobutenes, they may be vinyl double bonds (PAO-PIB-CH=C($CH_3$)$_2$; PAO=polymer block A; PIB=polymer block B without terminal group) or a vinylidene double bond (=methylidene double bond) (PAO-PIB-C(=$CH_2$)$CH_3$). It is preferably a terminal vinylidene double bond.

Accordingly, a particularly preferred embodiment of the invention relates to diblock copolymers A-B which comprise preferably at least 60 mol %, more preferably at least 70 mol % and especially at least 75 mol % of terminal olefinically unsaturated double bond, the terminal olefinically unsaturated double bond being in polymer block B and the terminal olefinically unsaturated double bond being a vinylidene group.

In an alternatively preferred embodiment of the invention, the inventive diblock copolymer comprises essentially no olefinically unsaturated double bonds. "Essentially" means that the diblock copolymer comprises at most 5 mol %, preferably at most 3 mol % and especially at most 1 mol % of olefinically unsaturated double bonds.

The number-average molecular weight $M_n$ of the inventive diblock copolymer is preferably from 500 to 10 000,more preferably from 1000 to 7000 and especially from 1000 to 5000.

The weight-average molecular weight $M_w$ of the inventive diblock copolymer is preferably from 500 to 15 000,more preferably from 1000 to 15 000 and especially from 1000 to 10 000.

The inventive diblock copolymer preferably has a relatively narrow molecular weight distribution. Accordingly, the polydispersity (PD=$M_w/M_n$) is preferably at most 3.0,for example from 1.05 to 3.0,more preferably at most 2.5,for example from 1.05 to 2.5 and especially at most 2.0,for example from 1.05 to 2.0.

The figures for number- and weight-average molecular weights quoted in the context of the present invention are based on values as determined by means of gel permeation chromatography (GPC) (polyisobutene standards).

The inventive diblock copolymers can be prepared by customary prior art processes for block copolymerization. To this end, for example, first the monomer of one block is polymerized and only when this monomer has essentially been consumed is the monomer of the second block added. It is also possible to end the polymerization of the first monomer, suitably of course in such a way that it can be converted further to the diblock copolymer, and if desired to isolate and/or to purify it. This "finished polymer" can then either be reacted with the monomer of the second block in a polymerization reaction, or it can be coupled with a "finished polymer" of the second polymer block to give the inventive diblock copolymer. Suitable coupling reagents and methods are known and are described, for example, in WO 2004/113402,which is hereby fully incorporated by reference. However, the coupling variant is generally suitable only for diblock copolymers which are not to have a terminal double bond.

In the abovementioned processes, it is preferred to prepare the poly-α-olefin block A as the first block.

The invention further relates to a process for preparing inventive diblock copolymers, comprising the following step:

(i) reacting a halogen-terminated oligomer or polymer of a $C_6$-$C_{22}$-α-olefin with isobutene or an isobutene-containing monomer mixture in the presence of a Lewis acid.

With regard to suitable and preferred $C_6$-$C_{22}$-α-olefins, reference is made to the above remarks. With regard to the suitable and preferred number of repeat units of $C_6$-$C_{22}$-α-olefins in the halogen-terminated oligomer or polymer, the same statements apply as for polymer block A.

Halogen-terminated oligomers or polymers of $C_6$-$C_{22}$-α-olefins can be prepared easily by hydrohalogenating oligomers or polymers of $C_6$-$C_{22}$-α-olefins terminated by a C—C double bond. Oligomers or polymers of $C_6$-$C_{22}$-α-olefins are either commercially available or can be prepared by customary prior art processes for polymerizing α-olefins. Such polymerization processes are known, for example, from WO 93/24539, EP-A-613873,WO 96/28486,WO 96/23751 and WO 99/67347 and the literature cited therein, which is hereby fully incorporated by reference. For example, it is possible to prepare terminally unsaturated oligomers or polymers of α-olefins by metallocene-catalyzed oligomerization/polymerization of the appropriate α-olefins; these can then be converted to the halogen-terminated oligomers or polymers by hydrohalogenating the terminal double bond.

Suitable reaction conditions for the hydrohalogenation are described, for example, in J. March, Advanced Organic Chemistry, 4th edition, Verlag John Wiley & Sons, p. 758-759,which is hereby fully incorporated by reference. Suitable reagents for the addition of hydrogen halide are in principle HF, HCl, HBr and HI. The addition of HI, HBr and HF can generally be effected at room temperature, whereas elevated temperatures are generally used for the addition of HCl.

The addition of hydrogen halides can in principle be effected in the absence or in the presence of initiators or of electromagnetic radiation. In the case of addition in the absence of initiators, especially of peroxides, the Markovnikov addition products are generally obtained. With addition of peroxides, the addition of HBr generally leads to anti-Markovnikov products.

Preferably, the oligomer or polymer of the $C_6$-$C_{22}$-α-olefin is hydrochlorinated, i.e. reacted with HCl to give the corresponding chlorine-terminated product.

The isobutene to be polymerized may be used either in the form of isobutene itself or in the form of isobutene-containing $C_4$ hydrocarbon mixtures (isobutene-containing monomer mixtures), i.e. mixtures which, as well as isobutene, comprise further hydrocarbons having 4 carbon atoms, such as butane, isobutane, 1-butene, 2-butene and butadiene. Examples thereof are $C_4$ raffinates, $C_4$ cuts from isobutane dehydrogenation, $C_4$ cuts from steamcrackers, FCC crackers (FCC: fluid catalyzed cracking), especially when they have been freed at least partly from 1,3-butadiene present therein. Suitable $C_4$ hydrocarbon mixtures comprise preferably at most 1% by weight, more preferably at most 0.5% by weight, even more preferably at most 0.2% by weight, in particular at most 0.05% by weight, especially at most 0.02% by weight, of butadiene, based on the total weight of the mixture. Preferred hydrocarbon mixtures are, for example, raffinate I and $C_4$ cuts from FCC crackers or from isobutane dehydrogenation. Raffinate I is a $C_4$ hydrocarbon stream with approximately the following composition: 0-5% isobutane; 4-12% n-butane; 35-55% isobutene; 15-55% 1-butene; 10-25% 2-butene and 0-0.5% 1,3-butadiene. $C_4$ cuts from FCC crackers have approximately the following composition: 5-15% n-butane, 15-25% isobutane, 14-18% isobutene, 15-25% trans-but-2-ene, 10-20% cis-but-2-ene and 10-20% 1-butene. $C_4$ cuts from isobutane dehydrogenation have approximately the following composition: 45-55% isobutene, 40-50% butanes and 2-10% 1- and 2-butene.

However, preference is given to using isobutene itself, i.e. isobutene in a purity of at least 90% by weight, preferably of at least 95% by weight and especially of at least 98% by weight.

Useful Lewis acids include covalent metal halides and semimetal halides which have an electron pair vacancy. Such compounds are known to those skilled in the art, for example from J. P. Kennedy et al. in U.S. Pat. Nos. 4,946,889, 4,327,201, 5,169,914, EP-A-206 756,EP-A-265 053,and comprehensively in J. P. Kennedy, B. Ivan, "Designed Polymers by Carbocationic Macromolecular Engineering", Oxford University Press, New York, 1991. They are generally selected from halogen compounds of titanium, of tin, of zinc, of aluminum, of vanadium or of iron, and the halides of boron. Preference is given to the chlorides, and in the case of aluminum also to the monoalkylaluminum dichlorides and the dialkylaluminum chlorides. Preferred Lewis acids are titanium tetrachloride, boron trichloride, boron trifluoride, tin tetrachloride, aluminum trichloride, vanadium pentachloride, iron trichloride, alkylaluminum dichlorides and dialkylaluminum chlorides. Particularly preferred Lewis acids are titanium tetrachloride, boron trichloride and ethylaluminum dichloride, and especially titanium tetrachloride. Alternatively, it is also possible to use a mixture of at least two Lewis acids, for example boron trichloride in a mixture with titanium tetrachloride.

It has been found to be useful to perform the reaction in (i) in the presence of an electron donor. Useful electron donors include aprotic organic compounds which have a free electron pair disposed on a nitrogen, oxygen or sulfur atom. Preferred donor compounds are selected from pyridines such as pyridine itself, 2,6-dimethylpyridine, and sterically hindered pyridines such as 2,6-diisopropylpyridine and 2,6-di-tert-butylpyridine; amides, especially N,N-dialkylamides of aliphatic or aromatic carboxylic acids such as N,N-dimethylacetamide; lactams, especially N-alkyllactams such as N-methylpyrrolidone; ethers, e.g. dialkyl ethers such as diethyl ether and diisopropyl ether, cyclic ethers such as tetrahydrofuran; amines, especially trialkylamines such as triethylamine; esters, especially $C_1$-$C_4$-alkyl esters of aliphatic $C_1$-$C_6$-carboxylic acids such as ethyl acetate; thioethers, especially dialkyl thioethers or alkyl aryl thioethers, such as methyl phenyl sulfide; sulfoxides, especially dialkyl sulfoxides such as dimethyl sulfoxide; nitriles, especially alkyl nitriles such as acetonitrile and propionitrile; phosphines, especially trialkylphosphines or triarylphosphines, such as trimethylphosphine, triethylphosphine, tri-n-butylphosphine and triphenylphosphine, and unpolymerizable, aprotic organosilicon compounds which have at least one organic radical bonded via oxygen.

More particularly, the donor compounds are selected from unpolymerizable, aprotic organosilicon compounds which have at least one organic radical bonded via oxygen. Examples of such radicals are alkyloxy, cycloalkyloxy, aryloxy, arylalkyloxy and acyloxy (alkylcarbonyloxy).

The organosilicon compounds may have one or more, for example 2 or 3,silicon atoms having at least one organic radical bonded via oxygen. Preference is given to those organosilicon compounds which have one, two or three, and especially 2 or 3,organic radicals bonded via oxygen per silicon atom.

Preferred organosilicon compounds of this type are those of the following general formula:

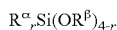

$R^\alpha{}_r Si(OR^\beta)_{4-r}$ in which r is 1, 2 or 3,
  $R^\alpha$ may be the same or different and are each independently $C_1$-$C_{20}$-alkyl, $C_3$-$C_7$-cycloalkyl, aryl or aryl-$C_1$-$C_4$-alkyl, where the three latter radicals may also have one or more $C_1$-$C_{10}$-alkyl groups as substituents, and
  $R^\beta$ may be the same or different and are each independently $C_1$-$C_{20}$-alkyl or, in the case that r is 1 or 2,two $R^\beta$ radicals together may be alkylene.

In the above formula, r is preferably 1 or 2. $R^\alpha$ is preferably a $C_1$-$C_8$-alkyl group, and especially an alkyl group which is branched or bonded via a secondary carbon atom, such as isopropyl, isobutyl, sec-butyl, or a 5-, 6- or 7-membered cycloalkyl group, or an aryl group, especially phenyl. The variable $R^\beta$ is preferably a $C_1$-$C_4$-alkyl group, or a phenyl, tolyl or benzyl radical.

Examples of preferred compounds of this type are dimethoxydiisopropylsilane, dimethoxyisobutylisopropylsilane, dimethoxydiisobutylsilane, dimethoxydicyclopentylsilane, dimethoxyisobutyl-2-butylsilane, diethoxyisobutylisopropylsilane, triethoxytolylsilane, triethoxybenzylsilane and triethoxyphenylsilane. Among these, triethoxyphenylsilane is particularly preferred.

The Lewis acid and the electron donor are preferably used in a molar ratio of from 20:1 to 1:20, more preferably from 5:1 to 1:5 and especially from 2:1 to 1:2.

In a further preferred embodiment of the process according to the invention, the reaction in step (i) is performed in the presence of an alkylammonium halide. Suitable alkylammonium halides are both monoalkylammonium salts and di-, tri- or tetraalkylammonium halides. Suitable alkyl radicals are $C_1$-$C_{10}$-alkyl radicals, such as methyl, ethyl, propyl, isopropyl, n-butyl, sec-butyl, isobutyl, tert-butyl, pentyl, hexyl, heptyl, octyl, nonyl and decyl, and constitutional isomers thereof. Preferred alkyl radicals are $C_1$-$C_6$-alkyl radicals, such as methyl, ethyl, propyl, isopropyl, n-butyl, sec-butyl, isobutyl, tert-butyl, pentyl, hexyl, and constitutional isomers thereof. In the di-, tri- and tetraalkylammonium salts, the alkyl radicals may be the same or different. Preference is given to tetraalkylammonium halides, especially to those having four identical alkyl radicals. Suitable halide counterions are fluoride, chloride and bromide, preference being given to chloride and bromide. Examples of suitable tetra-alkylammonium halides are tetramethylammonium fluoride, tetramethyl-ammonium chloride, tetramethylammonium bromide, tetraethylammonium fluoride, tetraethyl-ammonium chloride, tetraethylammonium bromide, tetrapropylammonium fluoride, tetrapropylammonium chloride, tetrapropylammonium bromide, tetrabutyl-ammonium fluoride, tetrabutylammonium chloride, tetrabutylammonium bromide, tetrapentylammonium fluoride, tetrapentylammonium chloride, tetrapentylammonium bromide, tetrahexylammonium fluoride, tetrahexylammonium chloride and tetrahexyl-ammonium bromide.

The reaction in step (i) can be performed either batchwise (discontinuously) or in continuous mode.

The polymerization is typically performed in a solvent. Useful solvents include all low molecular weight organic compounds or mixtures thereof which have a suitable dielectric constant and no abstractable protons and which are liquid under the polymerization conditions. Preferred solvents are hydrocarbons, for example acyclic hydrocarbons having from 2 to 8 and preferably from 3 to 8 carbon atoms, such as ethane, propane, n-butane and isomers thereof, n-pentane and isomers thereof, n-hexane and isomers thereof, n-heptane and isomers thereof, and n-octane and isomers thereof, cyclic alkanes having from 5 to 8 carbon atoms, such as cyclopentane, methylcyclopentane, cyclohexane, methylcyclohexane, cycloheptane, acyclic alkenes having preferably from 2 to 8 carbon atoms, such as ethene, propene, n-butene, n-pentene, n-hexene and n-heptene, cyclic olefins such as cyclopentene, cyclohexene and cycloheptene, aromatic hydrocarbons such as toluene, xylene, ethylbenzene, and halogenated hydrocarbons, such as halogenated aliphatic hydrocarbons, for example chloromethane, dichloromethane, trichloromethane, chloroethane, 1,2-dichloroethane and 1,1,1-trichloroethane and 1-chlorobutane, and halogenated aromatic hydrocarbons such as chlorobenzene and fluorobenzene. The halogenated hydrocarbons used as solvents do not comprise any compounds in which halogen atoms reside on secondary or tertiary carbon atoms.

Particularly preferred solvents are aromatic hydrocarbons, among which toluene is particularly preferred. Likewise preferred are solvent mixtures which comprise at least one halogenated hydrocarbon and at least one aliphatic or aromatic hydrocarbon. More particularly, the solvent mixture comprises hexane and a chloroalkane selected from chloromethane, dichloromethane, trichloromethane, 1-chlorobutane and mixtures thereof. The volume ratio of hydrocarbon to halogenated hydrocarbon is preferably in the range from 1:10 to 10:1, more preferably in the range from 4:1 to 1:4 and especially in the range from 2:1 to 1:2.

In general, step (i) of the process according to the invention will be performed at temperatures below 0° C., for example in the range from 0 to −100° C., preferably in the range from −20 to −80° C., and more preferably in the range from −30 to −80° C. The reaction pressure is of minor importance.

The heat of reaction is removed in a customary manner, for example by wall cooling and/or with utilization of evaporative cooling.

To terminate the reaction, the polymer is deactivated, for example by adding a protic compound, especially by adding water, alcohols such as methanol, ethanol, n-propanol, isopropanol, n-butanol, isobutanol, sec-butanol or tert-butanol, or mixtures thereof with water.

The process according to the invention leads to diblock copolymers which comprise, at the distal chain end of the B block (i.e. at the opposite chain end to the start of the B block chain), a terminus with a functional group. This functional group is, for example a —$CH_2$—$C(CH_3)_2$-halogen group. This is usually formed when the reaction is terminated with a protic deactivating agent. The halogen atom in this terminal group originates generally from the Lewis acid used in the polymerization; however, it may also originate from the halogen-terminated poly-α-olefin used. Halogen is preferably chlorine. These polymers are valuable intermediates for the preparation of further diblock copolymer derivatives. Examples of the derivatization include the alkylation of phenols and the elimination of hydrogen halide from the —$CH_2$—$C(CH_3)_2$ group to form an ethylenically unsaturated terminal group.

The terminal —$CH_2$—$C(CH_3)_2$-halogen group can be converted to an ethylenically unsaturated radical (vinyl or preferably methylidene double bond), for example, thermally, for example by heating to a temperature of from 70 to 200° C., or by treating with a base. Suitable bases are, for example, alkali metal alkoxides such as sodium methoxide, sodium ethoxide and potassium tert-butoxide, basic alumina, alkali metal hydroxides such as sodium hydroxide, and tertiary amines such as pyridine or tributylamine, cf. Kennedy et al., Polymer Bulletin 1985, 13, 435-439. Preference is given to using sodium ethoxide.

However, it is also possible to obtain diblock copolymers terminated ethylenically at the chain end, without introducing the —$CH_2$—$C(CH_3)_2$-halogen group beforehand. To this end, the chain end of the diblock copolymer is suitably reacted with a terminating reagent, which adds an ethylenically unsaturated group onto the chain end.

Suitable terminating reagents are, for example, trialkylallylsilane compounds, for example trimethylallylsilane. In this case, the chain end is terminated by adding a trialkylallylsilane compound. The use of the allylsilanes leads to the termination of the polymerization with introduction of an allyl radical at the end of the polymer chain; cf. EP 264 214.

Another example of a terminating reagent is 1,1-diphenylethylene. In this case, the chain end is terminated by adding 1,1-diphenylethylene and a base, which introduces a diphenyl-substituted double bond at the chain end; cf. J. Feldthusen, B. Iván, A. H. E. Müller and J. Kops, Macromol. Rep. 1995, A32, 639, J. Feldthusen, B. Iván and A. H. E. Müller, Macromolecules 1997, 30, 6989 and Macromolecules 1998, 31, 578, DE-A 19648028 and DE-A 19610350.

In addition, conjugated dienes, for example butadiene, are suitable as terminating reagents. In this case, the chain end is reacted with the conjugated diene and then deactivated as described above; cf. DE-A 40 25 961.

After the termination (deactivation and/or introduction of an ethylenically unsaturated terminal group), the solvent is generally removed in suitable units, such as rotary, falling-film or thin-film evaporators, or by decompressing the reaction solution.

To prepare inventive diblock copolymers which have essentially no olefinically unsaturated double bonds, diblock copolymers which have ethylenically unsaturated termination are subjected to a customary hydrogenation. Suitable hydrogenation conditions are described, for example, in Organikum, 17th edition, VEB Deutscher Verlag der Wissenschaften, Berlin, 1988,p. 288,which is hereby fully incorporated by reference.

For instance, the hydrogenation catalysts used may generally be all prior art catalysts which catalyze the hydrogenation of olefins to the corresponding alkanes. The catalysts can be used either in heterogeneous phase or in the form of homogeneous catalysts.

The hydrogenation catalysts preferably comprise at least one metal of group VIII. Particularly suitable metals of group VIII are selected from ruthenium, cobalt, rhodium, nickel, palladium and platinum.

The metals may also be used in the form of mixtures. Moreover, the catalysts may comprise, in addition to the metals of group VIII, also small amounts of further metals, for example metals of group VIIa, in particular rhenium, or metals of group Ib, i.e. copper, silver or gold. Particularly preferred metals of group VIII are ruthenium, nickel, palladium and platinum, in particular ruthenium, nickel and palladium, and more preferably ruthenium and nickel. The catalyst especially comprises nickel as the catalytically active species.

When a heterogeneous catalyst is used, it is suitably present in finely divided form. The finely divided form is achieved, for example, as follows:
 a) Black catalyst: shortly before use as a catalyst, the metal is deposited reductively from the solution of one of its salts.
 b) Adams catalyst: the metal oxides, in particular the oxides of platinum and palladium, are reduced in situ by the hydrogen used for the hydrogenation.
 c) Skeletal or Raney catalyst: the catalyst is prepared as a "metal sponge" from a binary alloy of the metal (in particular nickel or cobalt) with aluminum or silicon by leaching out one partner with acid or alkali. Residues of the original alloy partner often act synergistically.
 d) Supported catalyst: black catalysts can also be precipitated on the surface of a support substance. Suitable supports and support materials are described below.

Such heterogeneous catalysts are described in general form, for example, in Organikum, 17th edition, VEB Deutscher Verlag der Wissenschaften, Berlin, 1988, p. 288.

According to the configuration of the hydrogenation step, the support material may have various forms. When the hydrogenation is performed in liquid phase mode, the support material is generally used in the form of a fine powder. When the catalyst, in contrast, is used in the form of a fixed bed catalyst, for example, shaped bodies are used as the support material. Such shaped bodies may be in the form of spheres, tablets, cylinders, hollow cylinders, Raschig rings, extrudates, saddles, stars, spirals, etc., with a size (length of the longest dimension) of from about 1 to 30 mm. In addition, the supports may be present in the form of monoliths, as described, for example, in DE-A-19642770. In addition, the supports can be used in the form of wires, sheets, grids, meshes, fabrics and the like.

The supports may consist of metallic or nonmetallic, porous or nonporous material. Suitable metallic materials are, for example, highly alloyed stainless steels. Suitable nonmetallic materials are, for example, mineral materials, for example natural and synthetic minerals, glasses or ceramics, plastics, for example synthetic or natural polymers, or a combination of the two. Preferred support materials are carbon, especially activated carbon, silicon dioxide, especially amorphous silicon dioxide, aluminum oxide, and also the sulfates and carbonates of the alkaline earth metals, calcium carbonate, calcium sulfate, magnesium carbonate, magnesium sulfate, barium carbonate and barium sulfate.

The catalyst can be applied to the support by customary processes, for example by impregnation, wetting or spraying the support with a solution which comprises the catalyst or a suitable precursor thereof.

Suitable supports and processes for applying the catalyst thereto are described, for example, in DE-A-10128242,which is hereby fully incorporated by reference.

Homogeneous hydrogenation catalysts can also be used in the hydrogenation step. Examples thereof are the nickel catalysts which are described in EP-A-0668257. Disadvantages in the case of use of homogeneous catalysts are, however, their preparation costs and also the fact that they are generally not regeneratable. Therefore, preference is given to using heterogeneous hydrogenation catalysts in the hydrogenation step.

Particular preference is given to using the metal in supported form or as metal sponge. Examples of supported catalysts are especially palladium, nickel or ruthenium on carbon, especially activated carbon, silicon dioxide, especially on amorphous silicon dioxide, barium carbonate, calcium carbonate, magnesium carbonate or aluminium oxide, and the supports may be present in the above-described forms. Preferred support forms are the above-described shaped bodies.

The metallic catalysts may also be used in the form of their oxides, especially palladium oxide, platinum oxide or nickel oxide, which are then reduced under the hydrogenation conditions to the corresponding metals.

The metal sponge used is especially Raney nickel.

The catalyst amount for use depends upon factors including the particular catalytically active metal and its use form and can be determined by the person skilled in the art in the individual case.

The hydrogenation is effected at a temperature of preferably from 20 to 250° C., more preferably from 50 to 240° C. and especially from 150 to 220° C.

The reaction pressure of the hydrogenation reaction is preferably in the range from 1 to 300 bar, more preferably from 50 to 250 bar and especially from 150 to 230 bar.

Both reaction pressure and reaction temperature depend upon factors including the activity and amount of the hydrogenation catalyst used, and can be determined in the individual case by the person skilled in the art.

The conversion of the olefinically terminated diblock copolymers to their saturated equivalents can of course also be accomplished by means of other reducing agents, such as sodium borohydride, sodium hydride and lithium aluminum hydride, in particular complexed with transition metal salts, such as $FeCl_2$ or $CoBr_2$ (otherwise, the three reducing agents mentioned are too inert toward the olefinic double bonds), sodium in ethanol, trifluoroacetic acid in the presence of triethylsilane, hydrazine, hydroxylamine in ethyl acetate or hydroxylamine-O-sulfonic acid ($NH_2OSO_3H$). The reduction by means of these and further known reducing agents can be effected by general processes, as described, for example, in Jerry March, Advanced Organic Chemistry, 3rd edition, John Wiley & Sons, Chapters 5-10, and in the literature cited therein. However, preference is given to hydrogenations with the abovementioned catalysts.

Alternatively, inventive diblock copolymers which have no olefinically unsaturated double bonds can be prepared by subjecting diblock copolymers terminated by a halogen atom to a hydrodehalogenation. To this end, the halogen-terminated diblock copolymer is reacted with a suitable reducing agent, such as lithium aluminum hydride or magnesium, in the presence of secondary or tertiary alcohols (usually isopropanol).

The reduction by means of these and further known reducing agents can be accomplished by general processes, as described, for example, in Jerry March, Advanced Organic Chemistry, 3rd edition, John Wiley & Sons, Chapter 0-77, and in the literature cited therein.

The inventive diblock copolymers can be sent to different end uses. One example is their use in lubricant compositions. For these applications, and in particular when the diblock copolymers make up the main constituent of the lubricant composition, suitable diblock copolymers are especially those which have essentially no olefinically unsaturated double bonds, since, given otherwise identical performance properties, they are more oxidation-stable than their olefinically unsaturated equivalents. Diblock copolymers with olefinically unsaturated double bonds in the polymer chain, especially with terminal double bonds, in contrast, owing to the reactive double bond, constitute valuable intermediates for further conversion to functionalized diblock copolymers. Suitable functionalization reactions are all functionalization reactions known for olefinically terminated polyisobutenes, as described, for example, in WO 2004/113402.

The invention further provides for the use of inventive diblock copolymers in lubricant compositions.

The invention also provides a lubricant composition comprising at least one inventive diblock copolymer.

The remarks which follow relate both to the inventive composition and to the inventive use.

Lubricants serve as separating agents between two frictional partners moving relative to one another. The task of the lubricants is to prevent direct contact between them and hence firstly to lower the wear and secondly to reduce or to optimize friction. In addition, the lubricant can cool (i.e. remove frictional heat), seal the friction site, keep attritus particles away from the friction partners and other components, prevent corrosion or else reduce running noise. There are solid, consistent, liquid and gaseous lubricants. The selection is guided by the construction, the material pair, the ambient conditions and the stresses at the friction site.

The economically most important lubricant compositions are motor oils, transmission oils such as manual and automatic transmission oils, and lubricant greases.

Motor oils serve primarily to lubricate the parts moving relative to one another in internal combustion engines. In addition, frictional heat is removed, wear particles are transported away from the friction site, impurities are washed out and held in suspension by the oil and metal parts are protected from corrosion. Motor oils consist typically of mineral base oils, which comprise predominantly paraffinic constituents and are produced by complex workup and purification processes in the refinery, with a proportion of from approx. 2 to 10% by weight of additives (based on the active substance contents). For specific applications, for example high-temperature uses, the mineral base oils may be replaced partly or fully by synthetic components such as organic esters, synthetic hydrocarbons such as olefin oligomers, poly-α-olefins or polyolefins or hydrocracking oils. Motor oils must also have sufficiently high viscosities at high temperatures in order to ensure an impeccable lubrication effect and a good seal between cylinder and piston. Furthermore, the flow properties of motor oils must also be such that the engine can be started at low temperatures without any problem. Motor oils must be oxidation-stable and must not generate any more than small amounts of decomposition products in liquid or solid form or deposits even under difficult operating conditions. Motor oils disperse solids (dispersant performance), prevent deposits (detergent performance), neutralize acidic reaction products and form a wear protection film on the metal surfaces in the engine. Motor oils are typically characterized by viscosity classes (SAE classes; SAE=Society of Automotive Engineers).

Transmission oils, such as manual and automatic oils, are of similar composition to motor oils with regard to their base components and additives. Power is transmitted in the gear system of gearboxes to a high degree through the liquid pressure in the transmission oil between the teeth. The properties of the transmission oil must accordingly be such that it withstands high pressures over a prolonged period without decomposing. As well as the viscosity properties, wear, compressive strength, friction, shear stability, traction and running-in performance are the crucial parameters here.

Lubricant greases are thickened lubricant oils. Compared to the oils, they have the advantage that they do not run away from the friction site. Their fields of use are, for example, wheel bearings, moving systems such as ABS, generators, distributors, electric motors and small transmission motors.

Motor oils, transmission oils, such as manual and automatic oils, and lubricant greases comprise generally at least one, but usually some or all of the additives listed below in the amounts customary therefor (which are specified in brackets in % by weight, based on the overall lubricant composition):

(a) antioxidants (0.1 to 5%):
  sulfur compounds, for example reaction products of terpenes (α-pinene), resin oils or low molecular weight polybutenes with sulfur, dialkyl sulfides, dialkyl trisulfides, polysulfides, diaryl sulfides, modified thiols, mercaptobenzimidazoles, mercaptotriazines, thiophene derivatives, xanthates, zinc dialkyldithiocarbamates, thioglycols, thioaldehydes, dibenzyl disulfide, alkylphenol sulfides, dialkylphenol sulfides or sulfur-containing carboxylic acids
  phosphorus compounds, for example triaryl and trialkyl phosphites, dialkyl 3,5-di-tert-butyl-4-hydroxybenzylphosphonate or phosphonic acid piperazides
  sulfur-phosphorus compounds, for example zinc dialkyldithiophosphates (metal dialkyldithiophosphates also act as corrosion inhibitors and high-pressure additives in lubricant oils) or reaction products of phosphorus pentasulfide with terpenes (α-pinene, dipentene), polybutenes, olefins or unsaturated esters
  phenol derivatives, for example sterically hindered mono-, bis- or trisphenols, sterically hindered polycyclic phenols, polyalkylphenols, 2,6-di-tert-butyl-4-methylphenol or methylene-4,4-bis(2,6-di-tert-butylphenol) (phenol derivatives are often used in combination with sulfur-based or amine-based antioxidants)
  amines, for example arylamines such as diphenylamine, phenyl-α-naphthylamine or 4,4-tetramethyldiaminodiphenylmethane metal deactivators in the narrower sense, for example N-salicylideneethylamine, N,N'-disalicylideneethylenediamine, N,N'-disalicylidene-1,2-propanediamine, triethylenediamine, ethylenediaminetetraacetic acid, phosphoric acid, citric acid, glycolic acid, lecithin, thiadiazole, imidazole or pyrazole derivatives (b) viscosity index improvers (0.05 to 10%), for example: polyisobutenes having a molecular weight of typically from 10 000 to 45 000,polymethacrylates having a molecular weight of typically from 15 000 to 100 000, homo- and copolymers of 1,3-dienes such as butadiene or isoprene having a molecular weight of typically from 80 000 to 100 000, 1,3-diene-styrene copolymers having a molecular weight of typically from 80 000 to 100 000,maleic anhydride-styrene polymers in esterified form having a molecular weight of typically from 60 000 to 120 000, star-shaped polymers with block-like structure by virtue of units composed of conjugated dienes and aromatic monomers having a molecular weight of typically from 200 000 to 500 000,polyalkylstyrenes having a molecular weight of typically from 80 000 to 150 000,polyolefins composed of ethylene and propylene or styrene-cyclopentadiene-norbornene terpolymers having a molecular weight of typically from 60 000 to 140 000

(c) pour point depressants (cold flow improvers) (0.03 to 1%), for example bicyclic aromatics such as naphthalene with different long-chain alkyl radicals, polymethacrylates with from 12 to 18 carbon atoms in the alcohol radical, a degree of branching between 10 to 30 mol % and an average molecular weight of from 5000 to 500 000,long-chain alkylphenols and dialkylaryl phthalates or copolymers of different olefins (d) detergents (HD additives) (0.2 to 4%), for example calcium naphthenates, lead naphthenates, zinc naphthenates and manganese naphthenates, calcium dichlorostearates, calcium phenylstearates, calcium chlorophenylstearates, sulfonation products of alkylaromatics such as dodecylbenzene, petroleum sulfonates, sodium sulfonates, calcium sulfonates, barium sulfonates or magnesium sulfonates, neutral, basic and overbased sulfonates, phenates and carboxylates, salicylates, metal salts of alkylphenols and alkylphenol sulfides, phosphates, thiophosphates or alkenylphosphonic acid derivatives (e) ashless dispersants (0.5 to 10%), for example Mannich condensates of alkylphenol, formaldehyde and polyalkylenepolyamines, reaction products of polyisobutenylsuccinic anhydrides with polyhydroxyl compounds or polyamines, copolymers of alkyl methacrylates with diethylaminoethyl methacrylate, N-vinylpyrrolidone, N-vinylpyridine or 2-hydroxyethyl methacrylate or vinyl acetate-fumarate copolymers (f) extreme pressure additives (EP additives) (0.2 to 2.5%), for example chlorinated paraffins with chlorine content from 40 to 70% by weight, chlorinated fatty acid (especially having trichloromethyl end groups), dialkyl hydrogenphosphites, triaryl phosphites, aryl phosphates such as tricresyl phosphate, dialkyl phosphates, trialkyl phosphates such as tributyl phosphate, trialkylphosphines, diphosphoric esters, nitroaromatics, aminophenol derivatives of naphthenic acid, carbamic esters, dithiocarbamic acid derivatives, substituted 1,2,3-triazoles, mixtures of benzotriazole and alkylsuccinic anhydride or alkylmaleic anhydride, 1,2,4-thiadiazole polymers, morpholinobenzothiadiazole disulfide, chlorinated alkyl sulfides, sulfurized olefins, sulfurized chloronaphthalenes, chlorinated alkyl thiocarbonates, organic sulfides and polysulfides such as bis(4-chlorobenzyl) disulfide and tetrachlorodiphenyl sulfide, trichloroacrolein mercaptals or especially zinc dialkyldithiophosphates (ZDDPs)

(g) friction modifiers (0.05 to 1%), especially polar oil-soluble compounds which generate a thin layer on the frictional surface by adsorption, for example fatty alcohols, fatty amides, fatty acid salts, fatty acid alkyl esters or fatty acid glycerides (h) antifoam additives (0.0001 to 0.2%), for example liquid silicones such as polydimethylsiloxanes or polyethylene glycol ethers and sulfides (i) demulsifiers (0.1 to 1%), for example dinonylnaphthalenesulfonates in the form of their alkali metal and alkaline earth metal salts (j) corrosion inhibitors (also known as metal deactivators) (0.01 to 2%), for example tertiary amines and salts thereof, imino esters, amide oximes, diaminomethanes, derivatives of saturated or unsaturated fatty acids with alkanolamines, alkylamines, sarcosines, imidazolines, alkylbenzotriazoles, dimercaptothiadiazole derivatives, diaryl phosphates, thiophosphoric esters, neutral salts of primary n-$C_8$-$C_{18}$-alkylamines or cycloalkylamines with dialkyl phosphates having branched $C_5$-$C_{12}$-alkyl groups, neutral or basic alkaline earth metal sulfonates, zinc naphthenates, mono- and dialkylaryl sulfonates, barium dinonylnaphthalenesulfonates, lanolin (wool fat), heavy metal salts of naphthenic acid, dicarboxylic acid, unsaturated fatty acids, hydroxy fatty acids, fatty acid esters, pentaerythrityl monooleates and sorbitan monooleates, O-stearoylalkanolamines, polyisobutenylsuccinic acid derivatives or zinc dialkyldithiophosphates and zinc dialkyldithiocarbamates (k) emulsifiers (0.01 to 1%), for example long-chain unsaturated, naturally occurring carboxylic acid, naphthenic acids, synthetic carboxylic acids, sulfonamides, N-oleylsarcosine, alkanesulfamidoacetic acid, dodecylbenzenesulfonate, long-chain alkylated ammonium salts such as dimethyldodecylbenzylammonium chloride, imidazolinium salts, alkyl-, alkylaryl-, acyl-, alkylamino- and acylaminopolyglycols or long-chain acylated mono- and diethanolamines (l) dyes and fluorescence additives (0.001 to 0.2%)

(m) preservatives (0.001 to 0.5%)

(n) odor improvers (0.001 to 0.2%).

In particular, lubricant greases further also comprise (o) thickeners, for example metal soaps, polyureas, polyethylenes, bentonite or silica gels.

The inventive diblock copolymers may firstly serve as a synthetic lubricant component in the lubricant compositions, i.e. partly or completely replace the lubricant base. In this case, such a lubricant composition comprises the inventive diblock copolymers in not inconsiderable amounts, for example in an amount of >10% by weight, for example from >10 to 50 or from >10 to 70 or from >10 to 80 or from >10 to 90 or from >10 to 95 or from >10 to 100% by weight; or at least 20% by weight, for example from 20 to 50 or from 20 to 70 or from 20 to 80 or from 20 to 90 or from 20 to 95 or from 20 to 100% by weight; or at least 30% by weight, for example from 30 to 50 or from 30 to 70 or from 30 to 80 or from 30 to 90 or from 30 to 95 or from 30 to 100% by weight, based on the total weight of the lubricant composition. In this case, i.e. when the inventive diblock copolymers serve as synthetic lubricant components in the lubricant compositions, the lubricant composition is preferably a motor oil. Accordingly, the inventive diblock copolymers then partly or completely replace the mineral, partly or fully synthetic motor oil and themselves act as lubricants. A preferred embodiment of the invention thus relates to the use of the inventive diblock copolymers as a synthetic lubricant component in lubricant compositions, preferably in motor oils. In this case, the inventive diblock copolymers are preferably those which comprise essentially no olefinically unsaturated double bonds.

Secondly, the inventive diblock copolymers can be added to the lubricant compositions as an additive. Additives alter the physical and/or chemical properties of compositions to which they are added, without being present in significant proportions therein. "Without being present in significant proportions" means here that the composition comprises at most 10% by weight, for example from 0.1 to 10 or from 0.5 to 10 or from 1 to 10% by weight, or at most 5% by weight, for example from 0.1 to 5 or from 0.5 to 5 or from 1 to 5% by weight, based on the total weight of the lubricant composition, of the inventive diblock copolymers. When the inventive diblock copolymers are added to the lubricant compositions as an additive and are thus present in a minor amount, it is also possible to use diblock copolymers which comprise olefinically unsaturated double bonds. However, here too, for reasons of oxidation stability, preference is given to the use of inventive diblock copolymers which comprise essentially no olefinically unsaturated double bonds.

In total, the inventive lubricant composition comprises the at least one inventive diblock copolymer in an amount of preferably from 0.1 to 100% by weight, for example from 0.5 to 100% by weight or from 1 to 100% by weight, more preferably from 0.1 to 95% by weight, for example from 0.5 to 95% by weight or from 1 to 95% by weight, even more preferably from 0.1 to 90% by weight, for example from 0.5 to 90% by weight or from 1 to 90% by weight, even more preferably from 0.1 to 80% by weight, for example from 0.5 to 80% by weight or from 1 to 80% by weight, and especially from 0.1 to 70% by weight, for example from 0.5 to 70% by weight or from 1 to 70% by weight, based on the total weight of the composition.

When the inventive diblock copolymers are present in amounts of at most 10% by weight, they may also be those diblock copolymers which comprise an ethylenically unsaturated double bond. However, in this case too, for reasons of oxidation stability, the diblock copolymers preferably comprise essentially no ethylenically unsaturated double bonds.

In a preferred embodiment of the invention, the inventive diblock copolymers serve to improve the viscosity index of the lubricant composition comprising them.

The inventive diblock copolymers can thus partly or completely replace the abovementioned component (b) in inventive lubricant compositions.

As already stated, the viscosity index (VI) is a measure of the temperature dependence of the kinematic viscosity of a substance: viscosity is fundamentally a temperature-dependent parameter, which rises with increasing temperature and falls with falling temperature. The higher the viscosity index of a substance is, the lower is the temperature dependence of the viscosity of the particular substance, i.e. the lower is its temperature-dependent kinematic viscosity. The viscosity index is determined for mineral oil products to ISO 2909 or ASTM D 2270.

In order to ensure wide usability even at different temperatures, lubricant compositions with a high VI are desired.

The lubricant compositions are preferably fully synthetic, partly synthetic or mineral motor oils. (Fully) synthetic motor oils are understood to mean those based on organic esters, synthetic hydrocarbons, poly-α-olefins and polyolefins (e.g. polyisobutene). Partly synthetic motor oils are mixtures of mineral oils with synthetic motor oils, especially with the abovementioned synthetic motor oils. Among the fully synthetic, partly synthetic and mineral motor oils, multigrade motor oils are particularly preferred. Multigrade motor oils are motor oils which are equally suitable for winter and summer operation of engines because they have a usable viscosity both at low and at high temperatures.

Alternatively, the lubricant compositions are preferably transmission oils. Transmission oils are preferably those for the automotive sector, for example manual and automatic transmission oils.

Alternatively, the lubricant compositions are preferably lubricant greases.

The inventive diblock copolymers bring about considerably more favorable flow behavior at high and in particular at low temperatures: at low temperatures, for example at from 0 to −30° C. (starting of the engine under frosty conditions), the motor oils and transmission oils remain relatively mobile, and at the same time remain sufficiently viscous at high temperatures (operating temperature of the engine), such that the lubricant film does not break.

The motor oils mentioned can be used for a wide variety of different applications, but especially as four-stroke motor oils in automobile and motorcycle engines, locomotive diesel engines, etc.

A further advantage of the inventive diblock copolymers is their high shear stability, which is of significance especially with regard to their use in transmission oils.

Moreover, the inventive diblock copolymers have a good thickening action, which is advantageous in particular with regard to the use in transmission oils and especially in lubricant greases.

Accordingly, a further preferred embodiment of the invention relates to the use of the inventive diblock copolymers as thickeners in lubricant compositions. Thickeners serve to bind the base oil and thus increase its viscosity. Lubricant compositions in which the inventive diblock copolymers serve as thickeners are preferably selected from motor oils, transmission oils and lubricant greases and especially from lubricant greases. The inventive diblock copolymers can thus partly or completely replace component (o).

Apart from in lubricant compositions, the inventive diblock copolymers can also be used in hydraulic fluids, slideway oils, compressor oils, cycle oils, calendering oils or rolling oils.

The inventive diblock copolymers impart a high VI to the lubricant compositions comprising them. Furthermore, lubricant compositions comprising them also have a more favorable viscosity profile than comparable prior art lubricant compositions, since they possess a sufficiently low viscosity at low temperatures, but simultaneously also a sufficiently high viscosity at high temperatures, such that breakage of the lubricant film is prevented. In addition, they are very effective thickeners, which is advantageous in particular for use in lubricant greases and for the viscosity of lubricant compositions in the range of relatively high temperature (e.g. 100° C. and higher).

The invention is now illustrated by the nonlimiting examples which follow.

EXAMPLES

1. Synthesis Examples 1.1 Preparation of a poly-1-decene-polyisobutene diblock copolymer ("PAO-PIB")

a) Hydrochlorination of poly-1-decene

The poly-1-decene used was Durasyn® 266 (from Ineos; $M_n$ 530).

A 2 l flask with dry ice condenser, magnetic stirrer, cold bath, a gas inlet tube with a glass frit and nitrogen supply was initially charged with Durasyn® 266 (1123 g; 2.12 mol) in 420 g of dichloromethane. After the contents of the flask had been cooled to −20° C., the introduction of hydrogen chloride was commenced. During the introduction, the temperature was kept at from −10 to −20° C. After 1 h, the introduction of HCl gas was ended and the reaction mixture was stirred for another hour, in the course of which the temperature rose to 11° C. After 1 l of hexane had been added, the mixture was extracted nine times with 1 l of water each time, dried over sodium sulfate, filtered and freed of the solvents under reduced pressure on a rotary evaporator. 1151.1 g of a reddish, clear residue with a chlorine content of 1 g/100 g were obtained.

b) Polymerization of Isobutene with Polydecene Chloride

The apparatus used was two 2 l four-neck flasks A and B, which were connected to one another via a closable connection. Both flasks A (condensation flask) and B (reaction flask) were equipped with a magnetic stirrer, a thermometer, a septum, a dropping funnel with pressure equalizer and an attached dry ice condenser with a drying tube, and also a heating and cooling bath. Condensation flask A was initially charged with phenanthroline, 1-chloro-n-butane (600 ml) and hexane (300 ml). Isobutene (140 ml; 1.55 mol) was condensed into the dropping funnel and emptied into flask A. Subsequently, the mixture was titrated at −50° C. through the septum with a 1.6 M n-butyllithium solution (10 ml) in hexane, until there was a lasting brown color for 5 minutes. The stop valve to flask B was then opened and the contents of flask A were transferred with heating to flask B, which had been initially charged beforehand with phenyltriethoxysilane (5 ml) and poly-1-decene chloride (400 g) from example 1.1.a) at −70° C., where they condensed on the dry ice condenser. The solution was cooled to −78° C. Subsequently, titanium tetrachloride (4 ml; 25 mmol/l) was added. After 10 min, titanium tetrachloride (2 ml; 12.5 mmol) was added again and the mixture was stirred at −77° C. for another 110 min. The polymerization was terminated by adding first 50 ml of isopropanol and then 400 ml of water. The mixture was admixed with 1 l of hexane and washed three times with 1 l each time of water and three times with 0.5 l each time of saturated sodium chloride solution. After the organic phase had been dried over sodium sulfate and filtered, the solvents were removed under reduced pressure on a rotary evaporator. The polymerization product was obtained in the form of a red, clear residue (453.6 g). For purification, the polymer was shaken with 3300 g of isopropanol. The upper phase was removed and freed from the solvent under reduced pressure. The lower phase was extracted with hexane to isolate further product and freed from the solvent under reduced pressure. The product was obtained in the form of a yellow, slightly turbid oil.

c) Dehydrohalogenation of the Polymer

A 4 l flask with an oil bath, condenser and Teflon stirrer with a motor was initially charged with the product from example 1.1.b), 1500 g of THF and 180 g of potassium tert-butoxide and heated to 65° C. for 93 hours. Subsequently, the mixture was washed ten times with 1 l each time of saturated sodium chloride solution and then with 200 ml of isopropanol, dried over sodium sulfate, filtered and freed of the solvents under reduced pressure on a rotary evaporator. The dehydrohalogenated poly-1-decene-polyisobutene diblock copolymer had the following properties:

$M_n$: 2349
$M_w$: 4428
PD ($M_w/M_n$): 1.9
Chlorine content: below the detection limit 2. Performance Examples The viscosity (at 100° C.) and the viscosity index (VI) of the diblock copolymer from example 1.1 ("PAO-PIB") were determined. In addition, for comparison, the viscosity (at 100° C.) and the VI of a commercially available poly-1-decene with a number-average molecular weight $M_n$ of 2300 were determined.

The viscosity was determined to DIN 51562 and the VI to DIN ISO 2909. The results are listed in the table below.

TABLE

| Polymer | Viscosity (100° C.) [mm²/s] | VI | $M_n$ |
|---|---|---|---|
| PAO-PIB | 788 | 204 | 2349 |
| Poly-1-decene | 93 | 205 | 2300 |

In the application examples, polymers with olefinically unsaturated chain ends were used. For the corresponding hydrogenated products, however, the same viscosity behavior would be observed, since this is essentially independent of whether the chain terminus is saturated or unsaturated.

As the examples show, the inventive diblock copolymer possesses a significantly higher viscosity at 100° C. than the prior art poly-α-olefin, i.e. the probability that the lubricant film breaks is significantly lower for lubricant compositions which comprise the inventive diblock copolymer than for conventional lubricant compositions based on poly-α-olefins.

The invention claimed is:

1. A diblock copolymer of formula

A-B, wherein:
A is a polymer block A which is formed essentially from α-olefin units having from 6 to 22 carbon atoms; and
B is a polymer block B which is formed essentially from isobutene units, and
which copolymer has a number-average molecular weight of from 500 to 10,000.

2. The diblock copolymer according to claim 1, which comprises essentially no olefinically unsaturated double bonds.

3. The diblock copolymer according to claim 1, wherein at least 60% of the diblock copolymer chains comprise a terminal olefinically unsaturated double bond.

4. The diblock copolymer according to claim 1, wherein polymer block A comprises from 2 to 10 repeat units of α-olefin.

5. The diblock copolymer according to claim 4, wherein polymer block A comprises from 3 to 6 repeat units of α-olefin.

6. The diblock copolymer according to claim 1, wherein the α-olefin comprises from 6 to 14 carbon atoms.

7. The diblock copolymer according to claim 1, wherein polymer block B comprises from 2 to 50 repeat units of isobutene.

8. The diblock copolymer according to claim 7, wherein polymer block B comprises from 10 to 40 repeat units of isobutene.

9. A process for preparing the diblock copolymer according to claim 1, comprising:
(i) reacting a halogen-terminated oligomer or polymer of a $C_6$-$C_{22}$-α-olefin with isobutene or an isobutene-comprising monomer mixture in the presence of a Lewis acid.

10. The process according to claim 9, wherein the Lewis acid is selected from the group consisting of titanium tetrachloride and boron trichloride.

11. The process according to claim 9, further comprising:
(ii) terminating the reacting (i) by adding a protic compound.

12. The process according to claim 11, further comprising:
(iii) subsequently thermally treating, or treating with a base, a product obtained after the terminating (ii).

13. The process according to claim 12, further comprising:
(iv-a) subsequently hydrogenating a reaction product obtained after the subsequently thermally treating or treating with a base (iii).

14. The process according to claim 9, further comprising:
(iv-b) hydrohalogenating a reaction product obtained.

15. The process according to claim 9, further comprising:
(i-a) reacting a polymer formed in the reacting of isobutene or of the isobutene-comprising monomer mixture with a trialkylallylsilane compound, a conjugated diene, or 1,1-diphenylethene together with a base.

16. A method of manufacturing a lubricant composition, comprising adding at least one diblock copolymer to a lubricant composition precursor in an amount effective to improve the viscosity index of a lubricating oil or lubricating grease resulting from said adding, wherein said at least one diblock copolymer has the formula

A-B wherein:
A is a polymer block A which is formed essentially from α-olefin units having from 6 to 22 carbon atoms; and
B is a polymer block B which is formed essentially from isobutene units.

17. A synthetic lubricant component comprising a motor oil and a diblock copolymer, wherein said at least one diblock copolymer has the formula

A-B, wherein:
A is a polymer block A which is formed essentially from α-olefin units having from 6 to 22 carbon atoms; and
B is a polymer block B which is formed essentially from isobutene units.

18. A method for improving a viscosity profile of a lubricant composition, comprising adding in viscosity profile-improving amounts a diblock copolymer to a lubricant composition, wherein said at least one diblock copolymer has the formula

A-B, wherein:
A is a polymer block A which is formed essentially from α-olefin units having from 6 to 22 carbon atoms; and
B is a polymer block B which is formed essentially from isobutene units.

19. A method for increasing a viscosity index of a lubricant composition, comprising adding in viscosity index-increasing amounts a diblock copolymer to a lubricant composition, wherein said at least one diblock copolymer has the formula

A-B wherein:
A is a polymer block A which is formed essentially from α-olefin units having from 6 to 22 carbon atoms; and
B is a polymer block B which is formed essentially from isobutene units.

20. A method of thickening a lubricant composition, comprising adding the diblock copolymer in thickening amounts to a lubricant composition, wherein said at least one diblock copolymer has the formula

A-B wherein:
A is a polymer block A which is formed essentially from α-olefin units having from 6 to 22 carbon atoms; and
B is a polymer block B which is formed essentially from isobutene units.

21. A motor oil, a transmission oil, or a lubricant grease, comprising at least one diblock copolymer, wherein said at least one diblock copolymer has the formula

A-B wherein:
A is a polymer block A which is formed essentially from α-olefin units having from 6 to 22 carbon atoms; and
B is a polymer block B which is formed essentially from isobutene units.

22. The diblock copolymer according to claim 1, wherein the number-average molecular weight is from 1,000 to 7,000.

23. The diblock copolymer according to claim 1, wherein the number-average molecular weight is from 1,000 to 5,000.

* * * * *